April 15, 1958   A. R. MACARI   2,830,372
BITE BLOCK SHAPER
Filed Aug. 1, 1956

*INVENTOR.*
ANTHONY R. MACARI
BY
*Ingham J. Perrotta*
ATTORNEY

United States Patent Office 2,830,372
Patented Apr. 15, 1958

2,830,372

BITE BLOCK SHAPER

Anthony R. Macari, North Providence, R. I.

Application August 1, 1956, Serial No. 601,432

6 Claims. (Cl. 32—70)

The present invention relates to improvements in dental devices and more particularly to a dental device for use in trimming, shaping and otherwise forming wax and wax-like models for false palates, prosthesis for teeth and the like.

An object of the present invention is to provide an improved dental device for use in shaping and forming wax and wax-like models which has in combination a flat planar surface portion adapted for shaping a flat surface on such a model and means extending out of the plane of the flat surface portion which means has a preselected configuration for shaping other surface portions of the model out of the plane of the flat surface.

A further object of the present invention is to provide an improved dental device of the type herein described, wherein surface portions are incorporated therein for forming, trimming and shaping wax and wax-like models and wherein electrical heating means is associated with at least the planar surface portion for heating the same to facilitate working and forming the model.

Another object of the present invention is to provide an improved dental device of the type described wherein the same includes a planar surface portion for forming a flat surface on the model, a wall having a surface extending substantially perpendicularly from the planar surface portion so as to form corresponding surface portions of the model and a further arcuate surface portion having a half-egg shape for use in forming the palate portion of an "upper" model.

Still another object of the present invention is to provide an improved dental device of the type described wherein the wall portion extending substantially perpendicularly from the planar surface portion has associated therewith a knife-edge which is useful in trimming excess wax around the periphery of a model at the same time the flat surface is formed on the model.

Other objects of the present invention are to provide an improved dental device of the type described which is of simple construction, economical of manufacture and susceptible of use in a variety of manners by a dentist or a dental laboratory technician in connection with the making of prosthesis for teeth.

Figure 1:
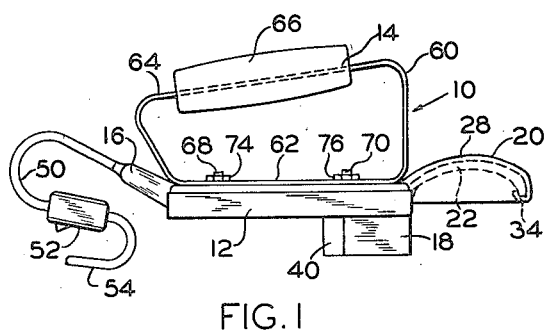
Figure 1 is a side elevational view of my improved dental device.
Figure 2:
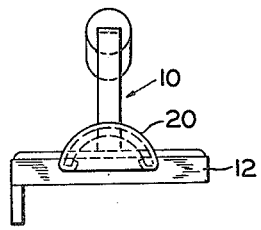
Figure 2 is an end elevational view showing the device of Figure 1 and especially the palate forming portion.
Figure 3:
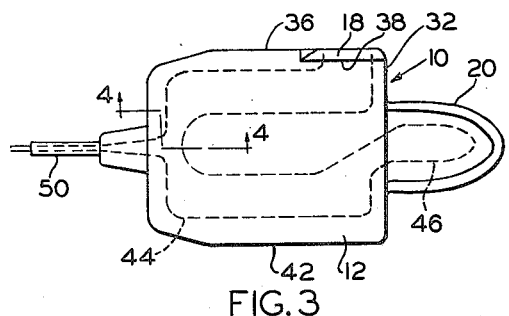
Figure 3 is a bottom plan view of the device of Figure 1 showing the heating coil relationship within the device in diagrammatic fashion.

Referring more particularly to the drawings, wherein like numerals apply to like parts throughout, it will be seen that I have disclosed a dental device 10 which is comprised of a body portion 12, handle means 14, electrical heating means 16, trimmer means 18 and palate forming means 20. As shown best in Figure 4, the body 12 is comprised of a thin face plate 22 which provides a planar surface portion 24 and has an up-turned peripheral wall at 26. A back plate 28 is provided and has a down-turned peripheral wall 30 which is received within the up-turned peripheral wall 26 on the face plate 22 so as to hold the walls 28 and 22 in spaced relationship. At the end 32 of the body 12, the walls 22 and 28 have integrally formed therewith the palate forming portion 20, the configuration of which is made by a conventional stamping operation. Figures 1, 2 and 3 best show the half-egg shape of the palate forming means 20. After stamping the walls 22 and 28 to the configuration shown, a peripheral portion 34 of the wall 28 is in-turned about the periphery of the wall 22 as shown in Figures 1 and 2 to hold the walls together.

Figure 5:
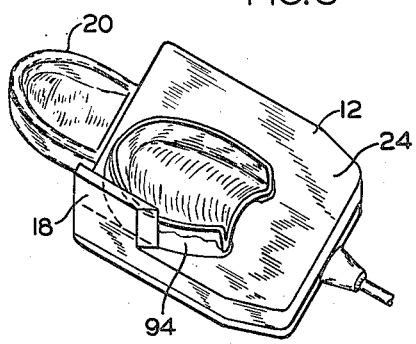
Figure 5 is a perspective view of the device showing an "upper" being shaped thereby.

The trimmer means 18 can similarly be formed by joining extension portions of the walls 22 and 28 at the side 36 of the body 12, or if desired, the trimmer means 18 can be formed by an integral extension of the bottom wall 22. In either event, the trimmer means 18 extends substantially perpendicularly from the planar surface portion 24 at an edge thereof so as to provide a surface at 38 which can be used for forming vertical walls of a model while forming a flat surface on a model using the planar surface 24. An end edge 40 of the wall 18 is formed with a knife-edge, as shown best in Figure 5, so as to facilitate shaving of wax and forming vertical wall surfaces of a model. It will be understood that if desired, the trimmer means 18 can be made detachable. Moreover, if desired, the trimmer means can be located at the opposite side edge 42 of the body 12.

Figure 4:
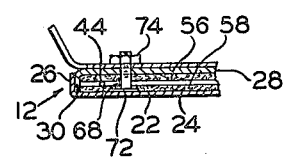
Figure 4 is a view taken substantially along the plane of line 4—4 in Figure 3 showing the manner in which the device is assembled.
Figure 6:
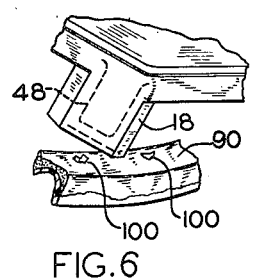
Figure 6 is a view showing a portion of the device and the manner in which it is used to soften wax portions of an "upper" prior to assembly of the latter with a "lower"

The heating means 16 includes an elongated resistance coil 44 which is disposed between the two walls 22 and 28 as shown in Figure 4, along a path best shown in Figures 3 and 6, so as to cover the planar surface portion 24 and also the palate forming means 20, as at 46, and if desired in the trimmer means, as at 48. The coil 44 has its ends electrically connected to wires in the conductor 50 which has an "on" and "off" switch at 52, the switch being connected with a source of electrical power by the conductor 54. As best shown in Figure 4, the heating coil 44 is electrically isolated from the walls 22 and 28 by layers of asbestos 56 and 58.

The handle means 14 includes an angulated metallic strap 60 which includes an attachment portion 62 and a handle carrying portion 64. A handle 66 is mounted on the handle receiving portion 64 and can be made of cork, wood or any other suitable material. The manner in which the attachment portion 62 is secured to the body 12 is best shown in Figures 1 and 4. A pair of bolts 68 and 70 have their heads soldered or otherwise secured to the interior surface of the wall 22 as at 72 with the shank of the bolt extending through the wall 28 and attachment portion 62 and receiving a nut 74 thereon for coupling the wall 22 with the wall 28 and also the handle attachment portion 62. Thus by the use of the pair of bolts 68 and 70 and the nuts 74 and 76, the entire assembly is held together and can easily be disassembled for replacement of the coil or other repairs.

Figure 7:
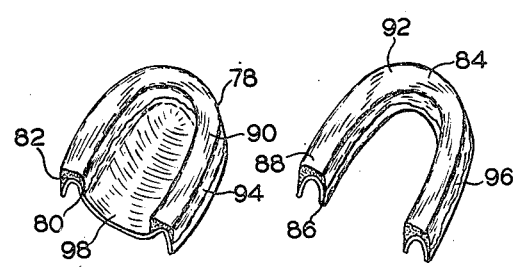
Figure 7 is a perspective view showing an "upper" and a "lower" of the type with which the present dental device is especially useful.

In order to better understand the manner in which the dental device of the present invention is used, a brief description of an "upper" and a "lower" will now be had. The "upper" 78 shown in Figure 7 is comprised of a base plate 80 with a ridge of bite wax 82 mounted thereon. The "lower" 84 is similarly comprised of a base plate 86 and a ridge of bite wax 88. The "upper" 78 and the "lower" 84 are the result of following the procedure now to be described. The dentist makes an impression of the gums of the patient and sends the impression to the dental laboratory where plaster or artificial stone reproductions are made of the patient's gums. Next the laboratory technician adapts the base plate 80 or 86, depending upon whether it is an "upper" or a "lower," and then he takes a sheet of bite wax and forms it into a strip of rectangular cross-section which he bends into U-shape and mounts on the ridge of the base plate as shown in Figure 7. The forming of the base plate and shaping of the wax is in large part done by hand initially. Thereafter, it has, heretofore, been the practice to use a knife or spatula heated on a Bunsen burner to cut, trim and shape the wax so as to provide a flat surface at 90 on the "upper" and a flat surface at 92 on the "lower" and to form smooth peripheral walls at 94 and 96. By using the device of the present invention, it is possible to simultaneously form the flat surfaces at 90 and 92 and the smooth peripheral surfaces 94 and 96. Also, by using the palate forming means 20, the palate portion 98 of the "upper" can easily be formed to a uniform shape. Next the "upper" and "lower" are set back to the dentist who first inserts the "upper" into the mouth of the patient and makes a mark on the wax ridge at the lip line of the patient. He then removes the "upper" and utilizes the device 10 for melting the excess wax away and forming a planar surface at the mark thus made. Thereafter, the dentist does the same with the "lower." Next, the dentist uses the trimmer attachment 18 in the fashion shown in Figure 6 to make trimmer marks or indents as at 100. These marks provide soft wax portions which extend above the plane of the surface 90 or 92. After forming the marks 100, the dentist inserts both the "upper" 78 and "lower" 84 into the mouth of the patient whereupon the patient bites thereby joining the "upper" and "lower" by the softened wax at 100. The assembled "upper" and "lower" are returned to the dental laboratory where they are placed on an articulator for completion of the making of the artificial teeth and prosthesis therefor.

From the foregoing it will be seen that the wax model is more easily made than in previous methods utilizing tools of the prior art. The operations in the dental laboratory and in the dentist's office are greatly facilitated and a more accurate model results. The greater accuracy is primarily made possible as a result of the formation of the planar surfaces 90 and 92 on the wax models along with the formation of the vertical surfaces 94 and 96 by the trimmer means 18. Also, the models more comfortably fit in the patient's mouth as a result of the formation of the palate 98 through the use of the palate forming means 20. A single device is used by the dentist or laboratory technician to perform a multiplicity of operations which is much more accurately done than by using a spatula heated by a Bunsen burner or by a spatula that is electrically heated. My device provides a planar surface 24 which has sufficient area to conveniently handle an entire model at the same time that the vertical surfaces 94 or 96 are being worked upon by the trimmer attachment 18.

Accordingly, it is believed that I have provided a device which accomplishes all of the objects hereinbefore described.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by these claims.

I claim:

1. A dental device for use in shaping wax and wax-like models for false palates, prosthesis for teeth and the like, which device comprises a body having a planar surface portion for shaping a flat surface on a model, and means extending substantially perpendicularly out of the plane of said planar surface portion for shaping model surface portions substantially perpendicular to said flat surface, said means being a wall extending from said body, electrical heating means associated with at least said planar surface portion for heating the same to facilitate working the model, and additional electrical heating means within said wall.

2. A dental device for use in shaping wax and wax-like models for false palates, prosthesis for teeth and the like, which device comprises a body having a planar surface portion for shaping a flat surface on a model, and means extending out of the plane of said portion for shaping other surface portions of the model out of the plane of said flat surface, said means including an arcuate wall substantially having a half-egg shape adapted to shape the base plate palate portion of an "upper" model.

3. A dental device for use in shaping wax and wax-like models for false palates, prosthesis for teeth and the like, which device comprises a body having a planar surface portion for shaping a flat surface on a model, and means extending out of the plane of said portion for shaping other surface portions of the model out of the plane of said flat surface, said means including an arcuate wall substantially having a half-egg shape adapted to shape the base plate palate portion of an "upper" model, and electrical heating means associated with at least planar surface portion for heating the same to facilitate working the model.

4. A dental device for use in shaping wax and wax-like models for false palates, prosthesis for teeth and the like, which device comprises a body having a planar surface portion for shaping a flat surface on a model, and means extending out of the plane of said portion for shaping other surface portions of the model out of the plane of said flat surface, said means including an arcuate wall substantially having a half-egg shape adapted to shape the base plate palate portion of an "upper" model, and means extending substantially perpendicularly out of the plane of said planar surface portion for shaping model surface portions substantially perpendicular to said flat surface.

5. A dental device for use in shaping wax and wax-like models for false palates, prosthesis for teeth and the like, which device comprises a body having a planar surface portion for shaping a flat surface on a model, and means extending out of the plane of said portion for shaping other surface portions of the model out of the plane of said flat surface, said means including an arcuate wall substantially having a half-egg shape adapted to shape the base plate palate portion of an "upper" model, and means extending substantially perpendicularly out of the plane of said planar surface portion for shaping model surface portions substantially perpendicular to said flat surface, said means being a substantially flat wall extending from said body.

6. A dental device for use in shaping wax and wax-like models for false palates, prosthesis for teeth and the like, which device comprises a body having a planar surface portion for shaping a flat surface on a model, and means extending out of the plane of said portion for shaping other surface portions of the model out of the plane of said flat surface, said means including an arcuate wall substantially having a half-egg shape adapted to shape the base plate palate portion of an "upper" model, means extending substantially perpendicularly out of the plane of said planar surface portion for shaping model surface portions substantially perpendicular to said flat surface, said means being a substantially flat wall extending from said body, and electrical heating means associated with at least said planar surface portion for heating the same to facilitate working the model.

References Cited in the file of this patent

UNITED STATES PATENTS

| | | |
|---|---|---|
| 2,111,645 | Slutzky et al. | Mar. 22, 1938 |
| 2,733,509 | Ikse | Feb. 7, 1956 |